US008049838B2

(12) United States Patent  (10) Patent No.: US 8,049,838 B2
Jung  (45) Date of Patent: Nov. 1, 2011

(54) DIRECT LIGHT TYPE BACKLIGHT UNIT AND COLOR FILTERLESS LIQUID CRYSTAL DISPLAY APPARATUS EMPLOYING THE SAME

(75) Inventor: Il-yong Jung, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 43 days.

(21) Appl. No.: 11/526,674

(22) Filed: Sep. 26, 2006

(65) Prior Publication Data

US 2007/0070265 A1    Mar. 29, 2007

(30) Foreign Application Priority Data

Sep. 26, 2005  (KR) .................. 10-2005-0089506

(51) Int. Cl.
*G02F 1/1335* (2006.01)
(52) U.S. Cl. ................ 349/65; 349/61; 349/62; 349/63; 349/64; 349/66; 349/67; 349/68; 349/69; 349/70; 349/71; 362/600; 362/607; 362/608; 362/613; 362/615
(58) Field of Classification Search ............... 349/61–71
See application file for complete search history.

(56) References Cited

U.S. PATENT DOCUMENTS

| 6,927,812 | B2 * | 8/2005 | Cho ............................ 349/65 |
| 7,413,330 | B2 * | 8/2008 | Furukawa ..................... 362/600 |
| 7,659,951 | B2 * | 2/2010 | Park ............................. 349/65 |
| 2001/0017774 | A1 * | 8/2001 | Ito et al. ...................... 362/31 |
| 2003/0234896 | A1 * | 12/2003 | Kim ............................. 349/65 |
| 2005/0041174 | A1 * | 2/2005 | Numata et al. ................ 349/61 |
| 2007/0047221 | A1 * | 3/2007 | Park ............................. 362/97 |

FOREIGN PATENT DOCUMENTS

| JP | 2001-312916 A | 11/2001 |
| JP | 2002-196329 A | 7/2002 |
| JP | 2003-114412 A | 4/2003 |

OTHER PUBLICATIONS

Dutch Office Action dated Jun. 24, 2010 issued in counterpart Dutch Application No. 1032550.

* cited by examiner

Primary Examiner — Thanh-Nhan P Nguyen
(74) Attorney, Agent, or Firm — Sughrue Mion, PLLC

(57) ABSTRACT

A direct light type backlight unit and a color filterless liquid crystal display (LCD) apparatus employing the same are provided. The direct light type backlight unit includes: a substrate; a plurality of light-emitting devices inclined with respect to the substrate; a diffraction grating which diffracts light emitted by the plurality of light-emitting devices at different angles according to wavelength and thereby separates the light into a plurality of color beams; and a plurality of reflectors, each reflector disposed at a side of one of the plurality of light-emitting devices, which reduces the range of angles of light incident on the diffraction grating.

24 Claims, 6 Drawing Sheets

DIRECT LIGHT TYPE BACKLIGHT UNIT AND COLOR FILTERLESS LIQUID CRYSTAL DISPLAY APPARATUS EMPLOYING THE SAME

CROSS-REFERENCE TO RELATED PATENT APPLICATIONS

This application claims priority from Korean Patent Application No. 10-2005-0089506, filed on Sep. 26, 2005, in the Korean Intellectual Property Office, the disclosure of which is incorporated herein in its entirety by reference.

BACKGROUND OF THE INVENTION

1. Field of the Invention

Apparatuses consistent with the present invention relate to a direct light type backlight unit and a liquid crystal display (LCD) apparatus employing the same and, more particularly, to a direct light type backlight unit capable of separating colors and a color filterless LCD apparatus employing the same.

2. Description of the Related Art

Typically, LCDs are used as flat panel display in notebooks, desktop computers, LCD-TVs, and mobile communication terminals. An LCD is a type of non-emissive flat panel display that needs external light to produce an image since it does not emit light. Thus, an LCD apparatus requires a backlight unit that is located behind a liquid crystal panel.

A liquid crystal panel simply transmits or blocks white light provided by a backlight unit. Thus, an LCD apparatus requires a color filter that transmits red R, green G, or blue B light in order to realize a color image. However, because each color element in the color filter transmits only light of a certain wavelength region, only about 30% of all light passing through the liquid crystal panel is transmitted. Taking into account the light loss due to other optical components, only less than about 10% of light irradiated by the backlight unit reaches a viewer. Because light loss caused by the color filter constitutes the largest percentage of the total light loss for the LCD apparatus, the color reproducibility of the LCD apparatus varies significantly depending on the performance of the color filter. Furthermore, since the color filter is expensive, the LCD apparatus has high manufacturing costs.

To overcoming these problems, a diffraction grating is used instead of a color filter to separate light into colored lights, thereby producing a color image.

Backlight units are classified into direct light type backlight units and edge light type backlight units according to the position of a light source arranged therein. In a direct light type backlight unit, a plurality of light sources disposed directly below an LCD panel emit light onto the LCD panel. In an edge light type backlight unit, a light source located along a sidewall of a light guide panel (LGP) emits light onto the LCD panel via the LGP.

U.S. Patent Application No. 2005-41174 discloses a conventional color filterless LCD apparatus for displaying a color image. The conventional color filterless LCD apparatus disclosed in the above-cited reference includes an edge light type backlight unit. Light emitted by a light source disposed along a side edge of the LGP and guided into the LGP at a predetermined angle is separated into R, G, and B color beams with different exit angles by a diffraction grating using the diffraction characteristics of the diffraction grating.

The R, G, and B color beams reach regions of a liquid crystal panel corresponding to color filter positions after passing through a cylindrical lens array. In this case, because the R, G, and B color beams are separately incident on the corresponding regions, it is possible to eliminate the use of a color filter that would otherwise be necessary for a typical liquid crystal panel.

The conventional color filterless LCD apparatus is restricted for use in compact display apparatus for the following reasons.

FIG. 1 shows separation of light according to its different wavelengths for a typical diffraction grating 1. Referring to FIG. 1, when light is incident on the diffraction grating 1 at a small incident angle α, angles βR, βG, and βB of R, G, and B color beams escaping from the diffraction grating 1 are large, thus making it difficult for the separate R, G, and B color beams to be incident on specific positions corresponding to the positions of a conventional color filter.

Thus, in order for the escaping R, G, and B color beams to be incident on precise required color positions within a liquid crystal panel, the incident angle α must be large. It is advantageous that G color beam has an exit angle of 0° and that R and B color beams have exit angles that are approximately symmetric about 0°. That is, the R, G, and B color beams may have exit angles such that they can be incident separately on the corresponding regions within the liquid crystal panel. For example, the R and B color beams may respectively have exit angles of −10° and +10° or −8° and +8°.

Thus, a color filterless display device known in the art uses an edge light type backlight unit with a LGP to obtain a significantly large incident angle of about 60° to 90°.

However, the edge light type backlight unit has problems that it is difficult for light to be incident on a diffraction grating at an optimum incident angle and to be uniformly delivered to a distal end of a LGP because the LGP guides light from one direction toward the other direction, thus resulting in poor light uniformity. Thus, a conventional filterless display device suffers a limitation to achieving a large-screen liquid crystal device.

In general, an edge light type backlight unit having a LGP can be used only in a compact LCD apparatus while a direct light type backlight unit is mainly used in a medium/large sized LCD apparatus.

Therefore, in order to realize a medium/large sized color filterless LCD apparatus using a direct light type backlight unit, it is necessary to make a beam incident on a diffraction angle at an angle suitable to achieve precise separation into component color beams.

SUMMARY OF THE INVENTION

The present invention provides a direct light type backlight unit that allows a beam to be incident onto a diffraction grating at an angle suitable to realize a medium/large sized color filterless liquid crystal display (LCD) apparatus and a color filterless LCD apparatus employing the same.

According to an exemplary aspect of the present invention, there is provided a direct light type backlight unit including: a substrate; a plurality of light-emitting devices inclined with respect to the substrate; a diffraction grating which diffracts light emitted by the plurality of light-emitting devices at different angles according to wavelength and thereby separates the light into a plurality of color beams; and a plurality of reflectors, each reflector disposed at a side of one of the plurality of light-emitting devices, which reduce the range of angles of light incident on the diffraction grating.

The light-emitting device may be a light-emitting diode (LED) or a cold cathode fluorescent lamp (CCFL).

A plurality of grooves are formed in the substrate, each groove comprising an inclined mounting surface, wherein each light-emitting device is disposed on the mounting surface of one of the plurality of grooves.

Each groove further comprises an oblique surface that is at a predetermined angle with respect to the mounting surface. The reflector faces the oblique surface of the groove.

The light-emitting device may be inclined with respect to the substrate at an angle of about 5° to about 20°. The backlight unit may further comprise a diffusion plate, disposed between the plurality of light-emitting devices and the diffraction grating, which diffuses light incident thereon.

According to another exemplary aspect of the present invention, there is provided an LCD apparatus for displaying a color image, the LCD apparatus comprising: a liquid crystal panel comprising a liquid crystal layer and devoid of a color filter; and a backlight unit as described above. The backlight unit is disposed adjacent to a rear surface of the liquid crystal panel and illuminates light on the liquid crystal panel.

The LCD apparatus may further comprise a cylindrical lens array which condenses beams emerging from the diffraction grating onto the liquid crystal panel. The cylindrical lens array may be disposed on the rear surface of the liquid crystal panel.

The liquid crystal panel may include a first transparent substrate and a second transparent substrate, where the liquid crystal layer is disposed therebetween. The LCD apparatus may further include a first polarizer disposed between the diffraction grating and the liquid crystal panel and a second polarizer disposed on a front surface of the liquid crystal panel.

The liquid crystal panel may further include an optical element which causes beams that have passed through the liquid crystal layer to propagate parallel to one another. The optical element may be a diffractive optical element or a prism.

BRIEF DESCRIPTION OF THE DRAWINGS

The above and other exemplary aspects and advantages of the present invention will become more apparent by the following detailed description exemplary embodiments thereof with reference to the attached drawings in which.

DETAILED DESCRIPTION OF EXEMPLARY EMBODIMENTS OF THE INVENTION

A direct light type backlight unit and a color filterless LCD apparatus employing the same according to exemplary embodiments of the present invention will now be described with reference to the accompanying drawings.

Figure 1:
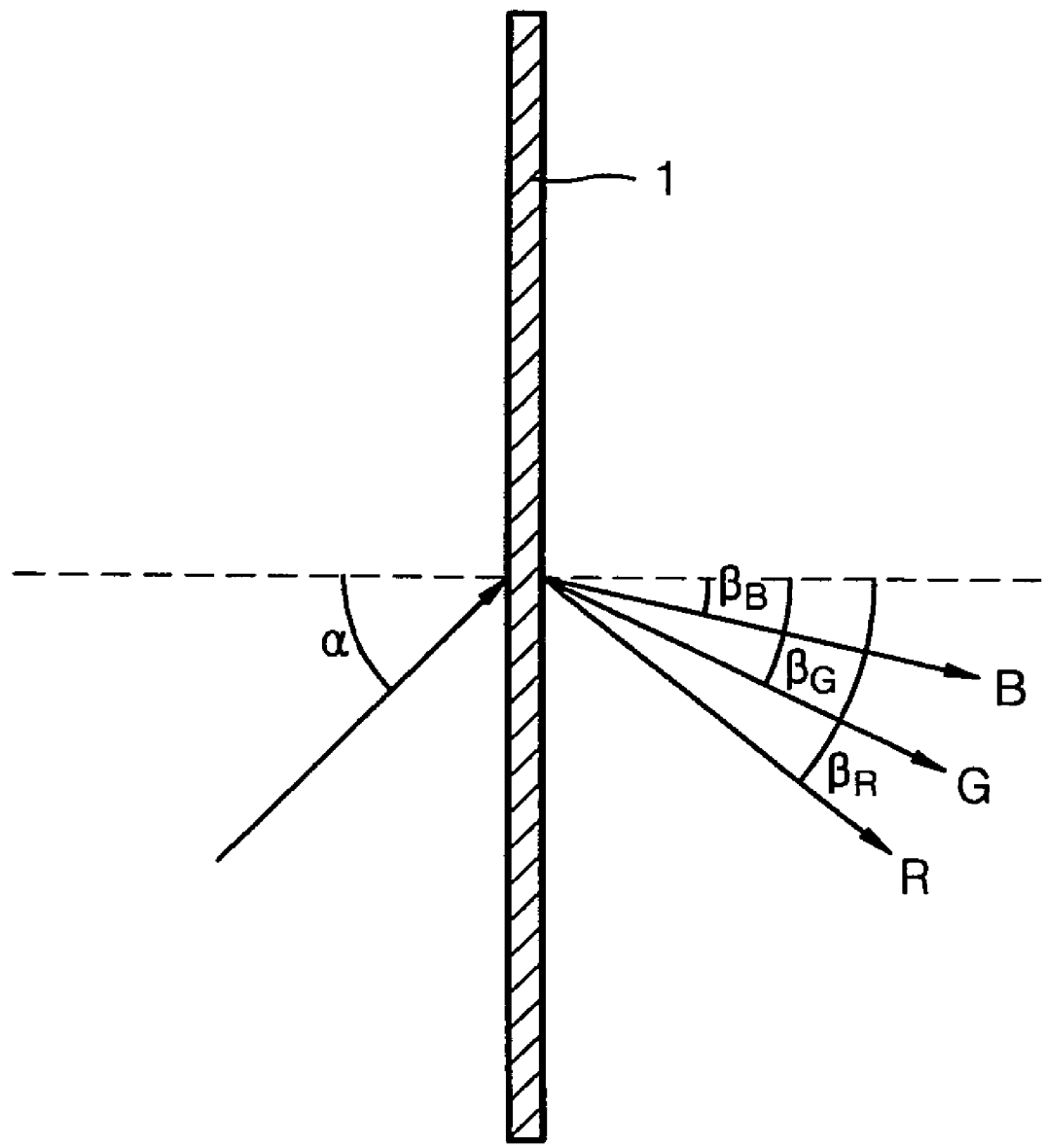
FIG. 1 shows separation of light according to its different wavelengths for a typical diffraction grating.
Figure 2:
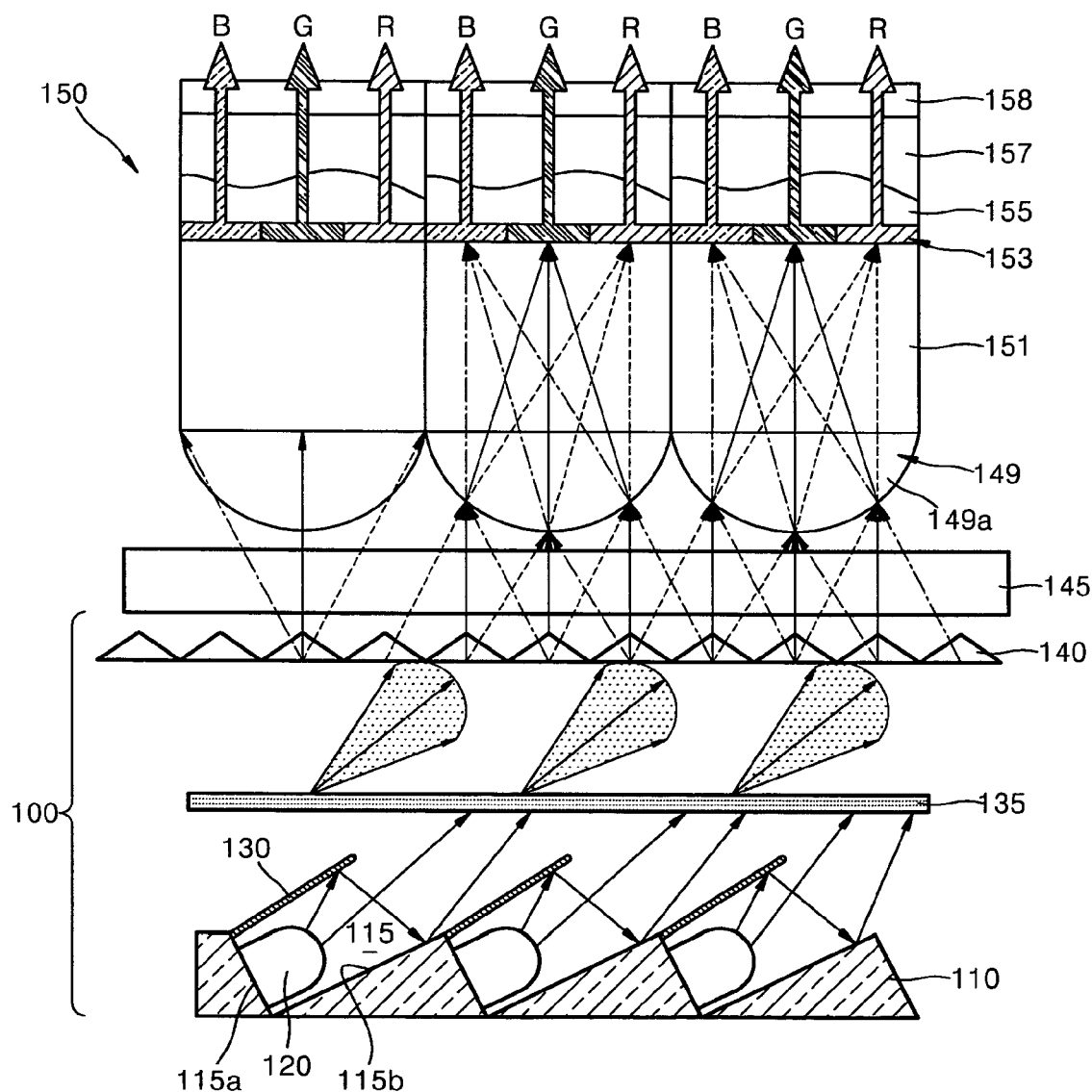
FIG. 2 shows a direct light type backlight unit and a color filterless LCD apparatus employing the same according to exemplary embodiments of the present invention.

FIG. 2 shows a direct light type backlight unit and a color filterless liquid crystal display (LCD) apparatus employing the same according to exemplary embodiments of the present invention. The LCD apparatus includes a backlight unit 100 and a liquid crystal panel 150.

Referring to FIG. 2, the backlight unit 100 includes a plurality of light-emitting devices 120 that are disposed slantingly to a substrate 110 below the liquid crystal panel 150 for producing a color image and a plurality of reflectors 130 reducing an angular range of light emitted by the light-emitting devices 120 to a diffraction grating 140 as a color beam separator. The diffraction grating 140 diffracts light emitted by the plurality of light-emitting devices 120 into different diffraction angles according to wavelengths to split as a plurality of color beams. The diffraction grating 140 may be deemed as one component of the backlight unit 100 or a separate component of the LCD apparatus. Hereinafter, for convenience of explanation, it is assumed that the diffraction grating 140 is one component of the direct light type backlight unit 100.

The light-emitting devices 120 are disposed at a predetermined angle to the substrate 110 so that light emitted by the light emitting devices 120 is incident on the diffraction grating 140 at a large angle required for the light to be diffracted at exit angle suitable to achieve area separation in color beams. Thus, most of the light emitted by the light-emitting device 120 is incident at an angle α to the diffraction grating 140. The angle α refers to an angle at which central light emitted by the light-emitting device 120 along a central axis thereof is incident on the diffraction grating 140. An angle at which the light-emitting device 120 is slanted towards a direction perpendicular to the substrate 110 is equal to an angle at which light is incident on the diffraction grating 140.

The light-emitting devices 120 may be slanted to the substrate 110 such that a green (G) color beam split according to color due to diffraction by the diffusion grating 140 has an exit angle of 0°, R and B color beams have exit angles that are approximately symmetric about 0°, and the R, G and B color beams have exit angles allowing area separation according to color. That is, the R, G, and B color beams obtained by diffracting and separating light emitted by the light-emitting devices 120 may have exit angles that allow them to be incident separately on corresponding regions within the liquid crystal panel 150. For example, the R and B color beams may respectively have exit angles of −10° and +10° or −8° and +8° as described above.

A plurality of grooves 115, each having a mounting surface 115a inclined by approximately the predetermined angle α, are formed in the substrate 110. Each of the light-emitting devices 120 is attached to the groove 115. Thus, it is possible to obtain a backlight unit having the light-emitting devices 120 emitting light controlled such that it is incident on the diffraction grating 140 at an optimum angle.

As described earlier, the optimum incident angle is significantly large. Thus, groove 115 may be formed such that the light-emitting device 120 makes an angle of about 5° to 20°, more preferably, 10° to 20°, with the substrate 110.

Assuming that the central axis of the light-emitting device 120 is approximately perpendicular to the mounting surface 115a, the light-emitting device 120 has an angle of 90°-α to the substrate 110 because the mounting surface 115a makes an angle of α with the substrate 110. Thus, when the light-emitting device 120 makes an angle in the range of about 5° to about 20° ("first range") with the substrate 110, the mounting surface 15a forms an angle in the range of about 70° to about 85° ("second range") with the substrate 110.

Thus, when the groove 115 is formed such that the mounting surface 115a makes an angle in the second range with the substrate 110, the light-emitting device 120 may be slanted to the substrate 110 by an angle in the first range. The angles in the first and second ranges refer to angles of the light-emitting device 120 and the mounting surface 115a to the substrate 110 in the horizontal direction, respectively. The horizontal direction of the substrate 110 is perpendicular to a thickness direction of the backlight unit 100.

When the light-emitting device 120 is slanted at an angle in the first range to the substrate 110, light emitted by the light-emitting device 120 is diffracted by the diffraction grating 140 such that G color beam has an exit angle of approximately 0° and R and B color beams have exit angles that are symmetric about 0° and allow them to have exit angles allowing area separation according to color so that they are incident separately on corresponding regions within the liquid crystal panel 150.

For example, the light-emitting device 120 may be an LED or a CCFL. When an LED is used as the light-emitting device 120, a plurality of LEDs are arranged along each of a plurality of lines to form a two-dimensional array. When a CCFL is used as the light-emitting device 120, one CCFL may be disposed for each line or a plurality of CCFLs may be arranged in a row.

The LED may be a color LED emitting light of a specific wavelength region or an LED including the package of a plurality of color LED chips to emit white light. For example, when R, G, and B color LEDs are used, they may be arranged alternately in each line such that color beams from the color LEDs are combined to form white light. Alternatively, an LED containing an LED chip emitting white light may be used.

When the angle of light incident on the diffraction grating 140 is not kept within a predetermined range, separate colors obtained by the diffraction grating 140 may mix with one another. Because a diverging beam is emitted by the light-emitting device 120, if all of the light emitted by the light-emitting device 120 is incident on the diffraction grating 140 as it is, the light incident on the diffraction grating 140 has a significantly large angular distribution centered at the incident angle α of central light.

However, in the backlight unit according to the present invention, the reflector 130 can reduce the angular range of the light incident on the diffraction grating 140, thereby preventing mixture of colors.

The groove 115 also has a oblique surface 115b that is perpendicular or near perpendicular to the mounting surface 115a. The reflector 130 is disposed opposite the oblique surface 115b. That is, the reflector 130 is located at one side of the light-emitting device 120 mounted on the mounting surface 115a and the oblique surface 115b is disposed at the opposite side.

For example, the reflector disposed opposite the oblique surface of one groove may be located on the oblique surface of an adjacent groove. The reflector 130 may be disposed parallel to the central axis of the light-emitting device 120 or be at a slight angle to the central axis. The reflector 130 reflects diverging light incident from the light-emitting device 120 in order to reduce the angular range of light being incident on the diffraction grating 140.

The reflector 130 may have an appropriate length, for example, greater than 10 mm, extending from the corresponding mounting surface 115a, to sufficiently guide light. Further, a reflective coating may be formed on the surface of the reflector 120 facing the light-emitting device 120. Because the light-emitting devices 120 are arranged to form a plurality of lines, the groove 115 and the reflector 130 may be disposed for each of the plurality of lines.

The opposite surface of each reflector 130 may also be reflectively coated. In this case, when some of light emitted from the light-emitting device 120 in one line is incident on the opposite surface of the reflector located in a neighboring line, a significant percentage of the incident light can be guided toward the diffraction grating 140.

Alternatively, the opposite surface of the reflector 130 may not be reflectively coated. In this case as well, since a significant amount of incident light can be reflected from the planar surface, the reflector 130 may be used in directing some of light emitted by the light-emitting device in a neighboring line toward the diffraction grating.

Some of the light emitted by the light-emitting device 120 may be incident directly on the oblique surface 115b and light reflected by the reflector 130 may travel toward the oblique surface 115b of the groove 115 facing the reflector 130. Thus, the oblique surface 115b may be a mirror-like surface or the reflector 130 may be extend up to the overall of the oblique surface 115b.

The use of the groove 115 formed such that the light-emitting device 120 is slanted to the substrate 110 and the reflector 130 reducing the angular range of light emitted by the light-emitting device 120 can sufficiently reduce the angular range of light incident on the diffraction grating 140. Thus, the LCD apparatus employing the backlight unit 100 can prevent problems such as mixture of colors.

The diffraction grating 140 diffracts incident light at different angles according to wavelength, thereby separating into a plurality of color beams, e.g., R, G, and B color beams, having different exit angles.

The light is incident on the diffraction grating at an optimum angle such that the separate R, G, and B color beams obtained by the diffraction grating 140 can be incident precisely in state of area separation according to color on positions within the liquid crystal panel corresponding to the positions of a conventional color filter. The optimum incident angle may be obtained by adjusting the angle a of the mounting surface 115a to the substrate 110 thus the angle of the light-emitting device 120 to the substrate 110.

If the light-emitting devices 120 are arranged perpendicular to the substrate 110, because all of the light emitted radially by the light-emitting device 120 is incident on the diffraction grating 140, the light is incident on the diffraction grating 140 at a symmetric radiation angle. Thus, it is difficult to make light emitted by the light-emitting device 120 incident on the diffraction grating 140 at an optimum angle.

However, when the light-emitting device 120 is slanted to the substrate 110 as in the present invention, most of the light emitted by the light-emitting device 120 is incident on the diffraction grating 140 at the angle α. Thus, by adjusting the angle a, it may be controlled that the light can be made incident on the diffraction grating 140 at an optimum angle such that a G color beam has an exit angle of 0° and R and B color beams have exit angles that are approximately symmetric about 0°. When the light is incident on the diffraction grating 140 at the optimum angle, the R, G, and B color beams have suitable exit angles that allow area separation according to color so that they are incident separately on corresponding regions within the liquid crystal panel 150.

Further, the present invention uses the reflector 130 to reduce the angular range of light being incident from the light-emitting device 120 onto the diffraction grating 140, thereby achieving smooth color separation by the diffraction grating 140. That is, the present invention enables the angle of light being incident on the diffraction grating 140 to be within a predetermined range, thereby preventing mixture of color beams.

The following simulations show the backlight unit 100 with the reflector 130 can reduce the angular range of light being incident on the diffraction grating 140. When the light-emitting device 120 is slanted at an angle of approximately 10°, the simulations were made for a case in which the reflector 130 has a length of about 3 mm that is sufficiently small to obtain a similar result to when the backlight unit 100 does not include the reflector 130 and a case in which the reflector 130 has a length of about 30 mm that is sufficiently long. The angular range of the light incident on the diffraction grating 140 can be obtained by measuring the amount of light for each position using a photodetector located at the position of the diffraction grating 140.

Figure 3A:
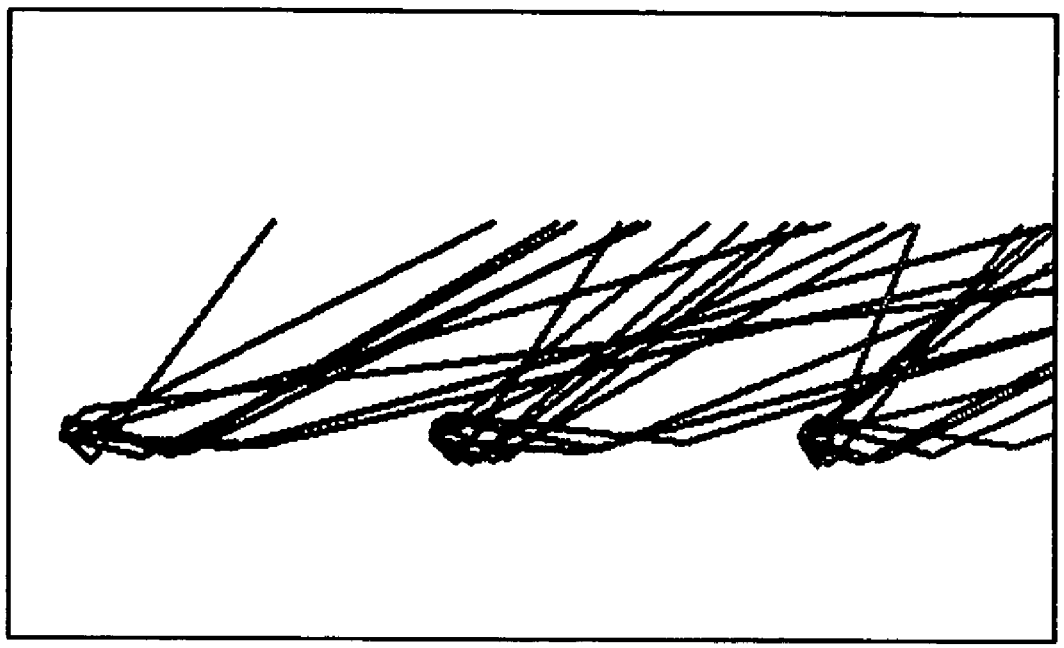
FIGS. 3A and 3B respectively illustrate the result of a ray tracing simulation within a backlight unit and a simulation result showing the distribution of angles of light being incident on a diffraction grating when the length of a reflector is about 3 mm.
Figure 3B:
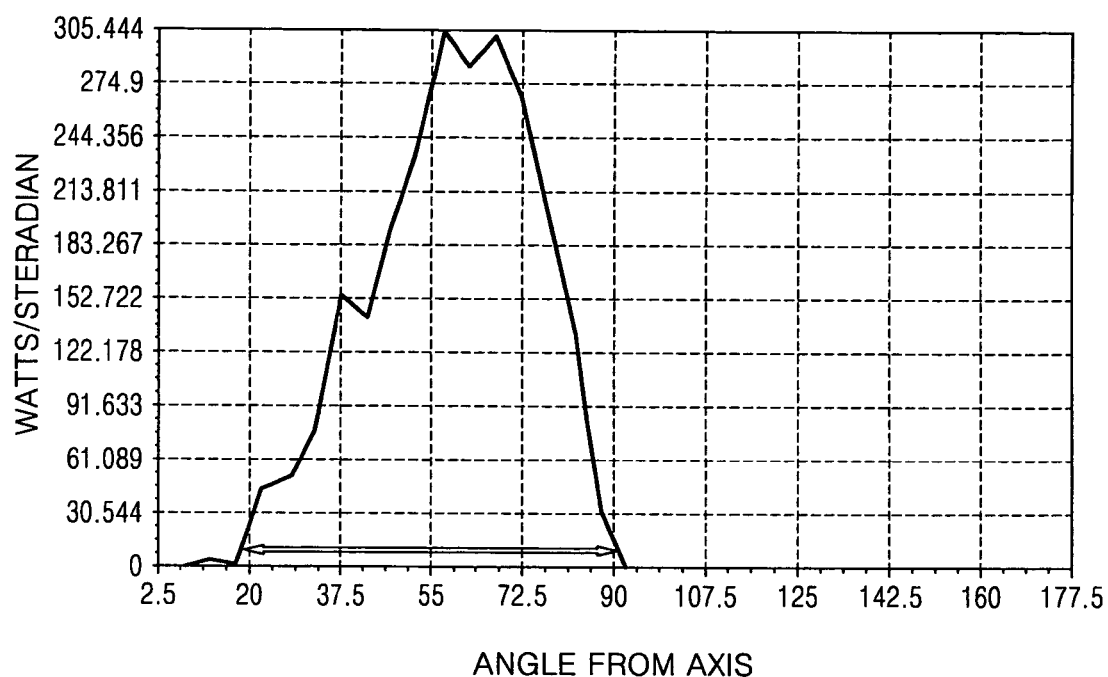
Figure 4A:
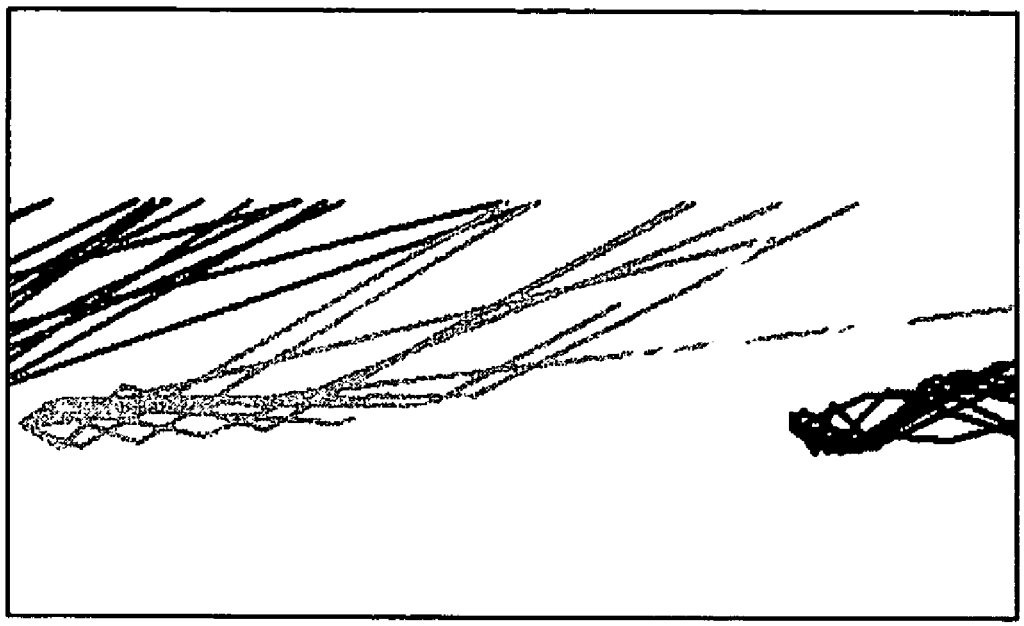
FIGS. 4A and 4B respectively illustrate the result of a ray tracing simulation within a backlight unit and a simulation result showing the distribution of angles of light being incident on a diffraction grating when the length of a reflector is about 30 mm.
Figure 4B:
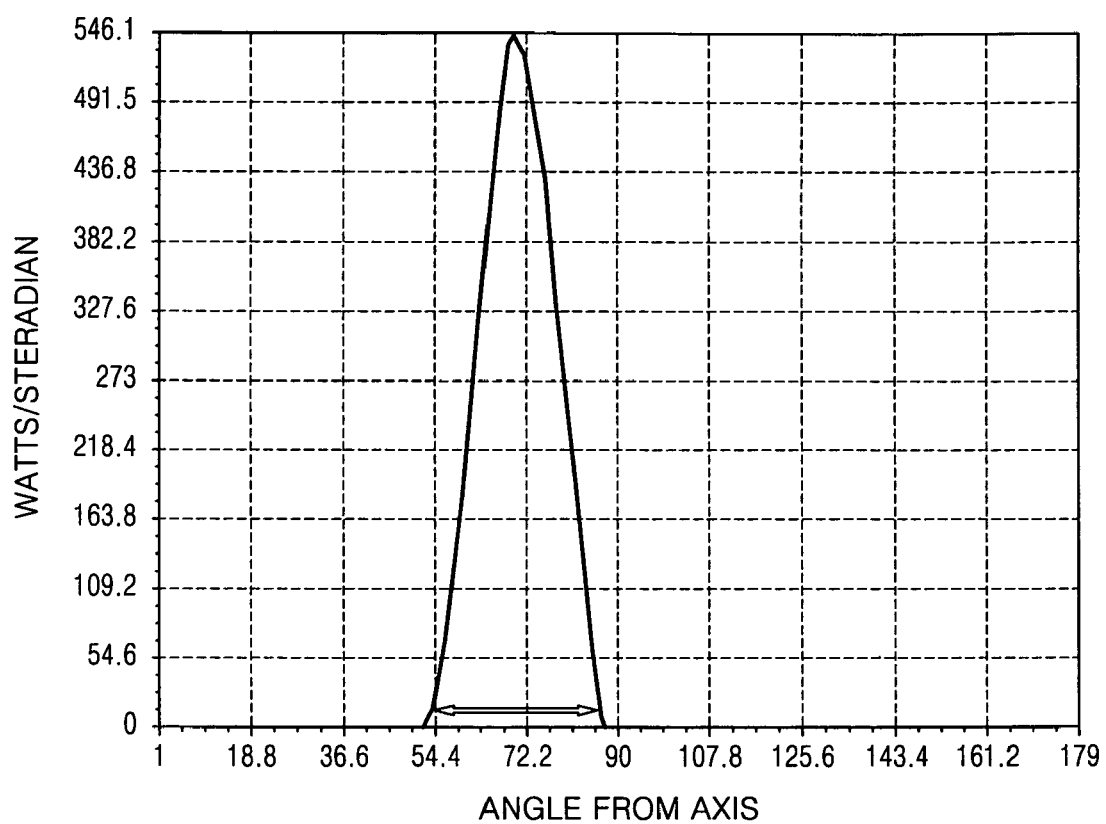

FIGS. 3A and 3B respectively illustrate the result of ray tracing simulation within the backlight unit 100 and a simulation result showing the distribution of angles of light incident on the diffraction grating 140 when the length of the reflector is about 3 mm. FIGS. 4A and 4B respectively illustrate the result of ray tracing simulation within the backlight unit 100 and a simulation result showing the distribution of angles of light incident on the diffraction grating 140 when the length of the reflector 130 is about 30 mm.

As shown in FIG. 3A, when the length of the reflector 130 is small, light emitted by the light-emitting device 120 is reflected a few times before being incident on the diffraction grating 140. Thus, the range of angles of light incident on the diffraction grating 140 cannot be narrowed. As shown in FIG. 3B, the light incident on the diffraction grating 140 has a significantly wide range of angles of about 20° to about 90°.

On the other hand, as shown in FIG. 4A, when the length of the reflector 130 is large, light emitted by the light-emitting device 120 is reflected many times before being incident on the diffraction grating 140. In this case, the range of angles of light incident on the diffraction grating 140 can be significantly narrowed. As shown in FIG. 4B, the light incident on the diffraction grating 140 has a range of angles of about 54° to about 80°. As evident from graphs of FIGS. 3B and 4B, the backlight unit 100 with the light-emitting device 120 slanted to the substrate 110 and the reflector 130 can sufficiently reduce the range of angles incident on the diffraction grating 140.

The backlight unit 100 may further include a diffusion plate 135 that is disposed between the array of the light-emitting devices 120 and the diffraction grating 140 and diffuses incident light to achieve uniform brightness distribution across the entire screen. The use of the diffusion plate 135 achieves brightness uniformity while allowing mixture of color beams when the light-emitting device 120 is a color LED.

A color filterless LCD apparatus employing the backlight unit 100 according to the present invention will now be described in detail.

Turning to FIG. 2, the color filterless LCD apparatus includes the liquid crystal panel 150 having a liquid crystal layer 153 but no color filter and the backlight unit 100 that is disposed below the liquid crystal panel 150 and illuminates the liquid crystal panel 150. The LCD apparatus further includes a cylindrical lens array 149 condensing light emerging from the diffraction grating 140 of the backlight unit 100 onto the liquid crystal panel 150.

The liquid crystal panel 150 includes two transparent substrates 151 and 157 with the liquid crystal layer 153 sandwiched therebetween. A first polarizer 145 is disposed between the diffraction grating 140 and the liquid crystal panel 150 while a second polarizer 158 is located on a front of the liquid crystal panel 150 on which an image is displayed. The backlight unit 100 is disposed to the rear of the liquid crystal panel 150. The liquid crystal panel 150 switches the liquid crystal layer 153 for each pixel to produce an image.

Because the liquid crystal panel 150 has a generally known configuration except that it has no color filter, detailed description thereof will not be given.

The cylindrical lens array 149 may be disposed on a rear of the liquid crystal panel 150. The cylindrical lens array 149 may be a single cylindrical lens sheet that can be integrated with the rear transparent substrate 151 of the liquid crystal panel 150.

As shown in FIG. 2, the cylindrical lens array 149 focuses separate R, G, and B color beams separated by the diffraction grating 140 onto different regions within each pixel on the liquid crystal panel 150. One cylindrical lens element 149a is disposed corresponding to one pixel on the liquid crystal panel 150 and distributes the R, G, and B color beams into three sub-pixels in the pixel.

The liquid crystal panel 150 further includes an optical element 155 that allows light passing through the liquid crystal layer 153 to propagate parallel to one another thereby providing clear, vivid images to a viewer. The optical element 155 may be a diffractive optical element or a prism. The optical element 155 may be disposed inside the front transparent substrate 157 as shown in FIG. 2.

The propagation of light in the color filterless LCD apparatus according to the present invention will now be described with reference to FIG. 2.

First, white light emitted by the light-emitting device 120 slanted to the substrate 110 is incident on the diffraction grating with a narrow range of angles and a uniform brightness distribution. In this case, the range of angles is narrowed by the reflector 130 and the brightness distribution is made uniform by the diffusion plate 135.

The incident light is diffracted by the diffraction grating 140 at different angles according to wavelength and then separated into R, G, and B color beams that then emerge from the diffraction grating 140 at different angles. The R, G, and B color beams are condensed by the cylindrical lens elements 149a of the cylindrical lens array 149 in such a way as to form different color regions in the liquid crystal layer 153 of the liquid crystal panel 150. Lastly, the R, G, and B color beams that have passed through the liquid crystal layer 153 are directed to be parallel to one another by the optical element 155 and reach a viewer's eyes.

An exemplary LCD apparatus according to the present invention employs the direct light type backlight unit 100 to display a color image without a color filter. The manufacturing costs can be reduced because the LCD apparatus eliminates the use of the color filter. This is because that manufacturing cost of the color filter constitutes about 20% of the total manufacturing costs. The LCD apparatus allows arrangement of a plurality of light sources below the liquid crystal panel 150, thereby providing a large screen and brightness uniformity.

As described above, the backlight unit 100 and the color filterless LCD apparatus employing the same use displacement of the light-emitting device 120 slanted to the substrate 110 and the reflector 130 at one side of the light-emitting device 120 to easily control the angle of light incident on the diffraction grating 140 in such a way as to reduce the range of the incident angles. This allows area separated R, G, and B color beams to precisely match regions within the liquid crystal panel 150 corresponding to positions of a conventional color filter while preventing mixture of colors.

A direct light type backlight unit can be used in the color filterless LCD apparatus of the present invention, thereby providing a large screen display. Unlike a conventional color filterless LCD apparatus using an edge light type backlight unit, the color filterless LCD apparatus using the direct light type backlight unit according to an exemplary embodiment of the present invention has no limitation on increasing brightness.

The use of R, G, and B color LEDs as light-emitting devices in the direct light type backlight unit according to the present invention enables 100% color reproducibility (to NTSC standard). The use of reflectors in combination with light-emitting devices slanted to a substrate enables exit angles of light to be kept within a predetermined range.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A direct light type backlight unit comprising:
    a substrate;
    a plurality of light-emitting devices inclined with respect to the substrate;
    a plurality of light-emitting devices inclined with respect to the substrate
    a diffraction grating which diffracts light emitted by the plurality of light-emitting devices at different angles according to wavelength and thereby separates the light into a plurality of color beams
    a plurality of reflectors, each reflector disposed at a side of one of the plurality of light-emitting devices, which reduce the range of angles of light incident on the diffraction grating
    wherein the plurality of light emitting devices are disposed between the substrate and the diffraction grating
    the substrate comprises a plurality of inclined mounting surfaces, wherein one of the light-emitting devices is disposed on each of the inclined mounting surfaces.

2. The direct light type backlight unit of claim 1, wherein the plurality of light-emitting devices are light-emitting diodes (LEDs) or cold cathode fluorescent lamps (CCFLs).

3. The direct light type backlight unit of claim 2, wherein the substrate comprises a plurality of grooves formed therein, each groove comprising the inclined mounting surface.

4. The direct light type backlight unit of claim 3, wherein each groove further comprises an oblique surface at a predetermined angle to the mounting surface, and
    wherein each reflector faces the oblique surface of one of the plurality of grooves.

5. The direct light type backlight unit of claim 3, wherein each of the light-emitting devices is inclined at an angle of about 5° to about 20° with respect to the substrate.

6. The direct light type backlight unit of claim 1, wherein the substrate comprises a plurality of grooves formed therein, each groove comprising an inclined mounting surface, wherein each light-emitting device is disposed on the mounting surface of one of the plurality of grooves.

7. The direct light type backlight unit of claim 6, wherein each groove further comprises an oblique surface that is at a predetermined angle with respect to the mounting surface, and
    wherein each of the plurality of reflectors faces the oblique surface of one of the plurality of grooves.

8. The direct light type backlight unit of claim 6, wherein each of the light-emitting devices is inclined at an angle of about 5° to about 20° with respect to the substrate.

9. The direct light type backlight unit of claim 1, further comprising a diffusion plate, disposed between the plurality of light-emitting devices and the diffraction grating, which diffuses light incident thereon.

10. A liquid crystal display (LCD) apparatus comprising:
    a liquid crystal panel comprising a liquid crystal and being devoid of a color filter
    a plurality of light-emitting devices inclined with respect to the substrate
    a diffraction grating, which diffracts light emitted by the plurality of light-emitting devices at different angles according to wavelength and thereby separates the light into a plurality of color beams
    a plurality of reflectors, each reflector disposed at a side of one of the plurality of light-emitting devices, which reduce the range of angles of light incident on the diffraction grating
    the plurality of light emitting devices are disposed between the substrate and the diffraction grating
    the substrate comprises a plurality of inclined mounting surfaces, wherein one of the light emitting devices is disposed on each of the inclined mounting surfaces.

11. The apparatus of claim 10, wherein the plurality of light-emitting devices are light-emitting diodes (LEDs) or cold cathode fluorescent lamps (CCFLs).

12. The apparatus of claim 11, wherein the substrate comprises a plurality of grooves formed therein, each groove comprising the inclined mounting surface.

13. The apparatus of claim 12, wherein each groove further comprises an oblique surface at a predetermined angle to the mounting surface, and
    wherein each reflector faces the oblique surface of one of the plurality of grooves.

14. The apparatus of claim 12, wherein each of the light-emitting devices is inclined at an angle of about 5° to about 20° with respect to the substrate.

15. The apparatus of claim 10, wherein the substrate comprises a plurality of grooves formed therein, each groove comprising an inclined mounting surface, wherein each light-emitting device is disposed on the mounting surface of one of the plurality of grooves.

16. The apparatus of claim 15, wherein each groove further comprises an oblique surface that is at a predetermined angle with respect to the mounting surface, and
    wherein each of the plurality of reflectors faces the oblique surface of one of the plurality of grooves.

17. The apparatus of claim 15, wherein each of the light-emitting devices is inclined at an angle of about 5° to about 20° with respect to the substrate.

18. The apparatus of claim 10, further comprising a diffusion plate, disposed between the plurality of light-emitting devices and the diffraction grating, which diffuses light incident thereon.

19. The apparatus of claim 10, further comprising a cylindrical lens array which condenses beams emerging from the diffraction grating onto the liquid crystal panel.

20. The apparatus of claim 19, wherein the cylindrical lens array is disposed on the rear surface of the liquid crystal panel.

21. The apparatus of claim 20, further comprising:
    a first polarizer disposed between the rear surface of the liquid crystal panel and the diffraction grating; and
    a second polarizer disposed on a front surface of the liquid crystal panel; and
    wherein the liquid crystal panel further comprises a first transparent substrate and a second transparent substrate, wherein the liquid crystal layer is disposed between the first transparent substrate and the second transparent substrate.

22. The apparatus of claim 10, further comprising:

a first polarizer disposed between the rear surface of the liquid crystal panel and the diffraction grating; and a second polarizer disposed on a front surface of the liquid crystal panel; and wherein the liquid crystal panel comprises a first transparent substrate and a second transparent substrate, wherein the liquid crystal layer is disposed between the first transparent substrate and the second transparent substrate.

23. The apparatus of claim 10, wherein the liquid crystal panel further comprises an optical element which causes beams that have passed through the liquid crystal layer to propagate parallel to one another.

24. The apparatus of claim 23, wherein the optical element is one of a diffractive optical element and a prism.

* * * * *